United States Patent [19]

Lai

[11] Patent Number: 5,737,184

[45] Date of Patent: Apr. 7, 1998

[54] COMPUTER MAIN CIRCUIT BOARD RACK STRUCTURE

[76] Inventor: Wen Hsien Lai, No. 57, Lane 350, Nanshang Rd., Gueishan Hsiang, Taoyuan Hsien, Taiwan

[21] Appl. No.: 658,967

[22] Filed: Jun. 4, 1996

[51] Int. Cl.⁶ .................... G06F 1/16; H05K 7/14
[52] U.S. Cl. ............... 361/683; 361/726; 361/727
[58] Field of Search .................. 211/41; 364/708.1; 361/683, 686, 725–727, 732, 740, 741, 756, 759, 796, 799, 801, 802

[56] References Cited

U.S. PATENT DOCUMENTS

| | | | |
|---|---|---|---|
| 4,977,532 | 12/1990 | Borkowicz et al. | 361/683 |
| 5,467,254 | 11/1995 | Brusati et al. | 361/799 |
| 5,587,877 | 12/1996 | Ryan et al. | 361/683 |

Primary Examiner—Michael W. Phillips
Attorney, Agent, or Firm—Pro-Techtor International

[57] ABSTRACT

A computer main circuit board rack structure including a main circuit board rack sink disposed on a computer housing and an upper and a lower rails formed respectively at upper and lower ends of the rack sink. A drawable computer main circuit board rack is inserted into the computer housing through the upper and lower rails of the rack sink. The computer housing is formed with several engaging holes at an end near the main circuit board rack sink and several V-shaped leaf springs are disposed in the upper rail. The main circuit board rack is disposed with several engaging hooks for engaging with the engaging holes of the computer housing so as to resiliently secure the main circuit board rack on the computer housing without using any screw or rivet. The computer main circuit board rack can be conveniently drawn out of the computer housing without using any tool.

2 Claims, 3 Drawing Sheets

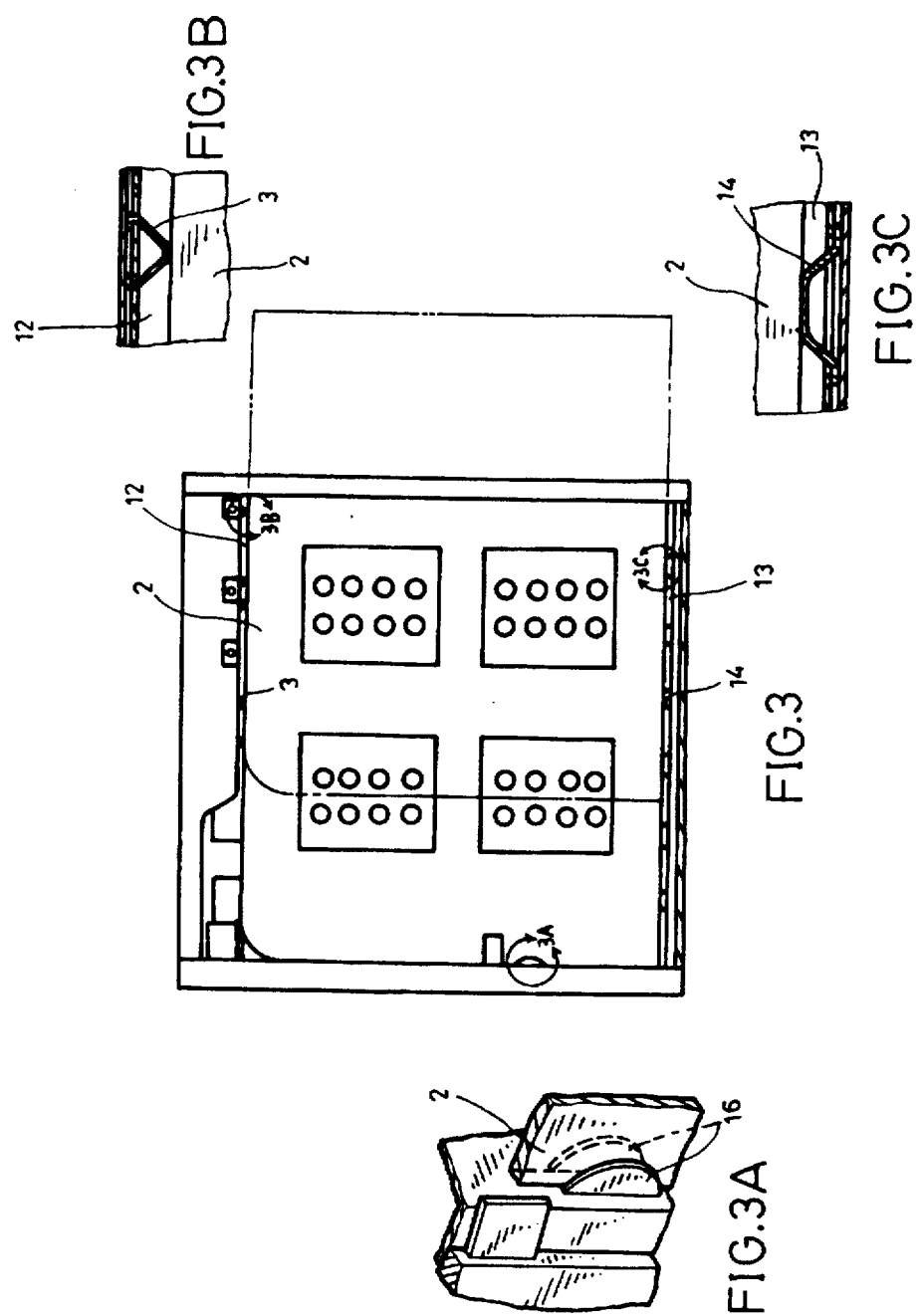

COMPUTER MAIN CIRCUIT BOARD RACK STRUCTURE

BACKGROUND OF THE INVENTION

The present invention relates to a computer main circuit board rack structure, and more particularly to a drawable computer main circuit board rack which is secured to the computer housing without using any screw only by means of engaging hooks disposed on the rack and engaging holes formed on the computer housing and cooperative leaf springs.

A conventional computer main circuit board is mounted on a main circuit board rack. In order to conveniently take out the main circuit board rack for inserting network card, audio card or CPU, etc. on the main circuit board, the main circuit board rack is generally assembled with the computer housing in a drawing manner, that is, the main circuit board rack is slidable between an upper and a lower rails of the computer housing. Normally, the main circuit board rack is secured to the computer housing by screws, while when it is necessary to replace the interface card on the main circuit board, a screwdriver is used to unscrew the screws from the main circuit board rack so as to move out the main circuit board rack along the rails of the computer housing. After the replacement is completed, the main circuit board rack is restored to its home position and again secured to the computer housing by screws. Such procedure is quite time-consuming and troublesome. Moreover, in order to facilitate the drawing movement, the main circuit board rack is not tightly assembled with the upper and lower rails of the computer housing. Accordingly, the contacting area therebetween is relatively small and the conductivity is poor. As a result, the noise of the computer cannot be easily isolated. This will affect the ability of the computer.

It is therefore tried by the applicant to develop an improved drawable computer main circuit board rack to eliminate the above problems.

SUMMARY OF THE INVENTION

It is therefore a primary object of the present invention to provide an improved computer main circuit board rack structure in which the computer housing is formed with several engaging holes and the main circuit board rack is disposed with several engaging hooks for engaging with the engaging holes of the computer housing. In cooperation with several leaf springs disposed in the upper rail of the computer housing, the main circuit board rack can be drawably secured in a main circuit board rack sink of the computer housing without using any tool or screw.

It is a further object of the present invention to provide the above main circuit board rack structure in which when it is necessary to replace the interface card on the main circuit board, the main circuit board rack can be quickly drawn out of the main circuit board rack sink to save time and labor.

It is still a further object of the present invention to provide the above main circuit board rack structure in which the leaf springs in the upper rail of the computer housing keep in tight contact with the the main circuit board rack so that the contacting area between the main circuit board rack and the computer housing is increased to achieve a better conductivity. As a result, the noise of the computer can be easily isolated so as to enhance the ability of the computer.

The present invention can be best understood through the following description and accompanying drawing, wherein:

BRIEF DESCRIPTION OF THE DRAWINGS

FIG. 1A is an enlarged view partially in section of the encircled portion of FIG. 1 marked 1A;

FIG. 2A is an enlarged perspective view of the encircled portion of FIG. 2 marked 2A;

FIG. 3 is a sectional view of the present invention;

FIG. 3A is an enlarged perspective view of the encircled portion of FIG. 3 marked 3A;

FIG. 3B is an enlarged sectional view of the encircled portion of FIG. 3 marked 3B;

FIG. 3C is an enlarged sectional view of the encircled portion of FIG. 3 marked 3C.

DETAILED DESCRIPTION OF THE PREFERRED EMBODIMENT

Figure 2:
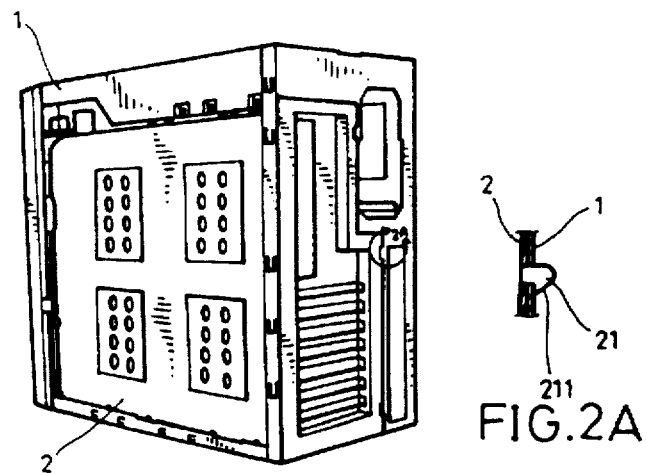
FIG. 2 shows that the main circuit board of FIG. 1 is inserted and secured in the computer housing.
Figure 1:
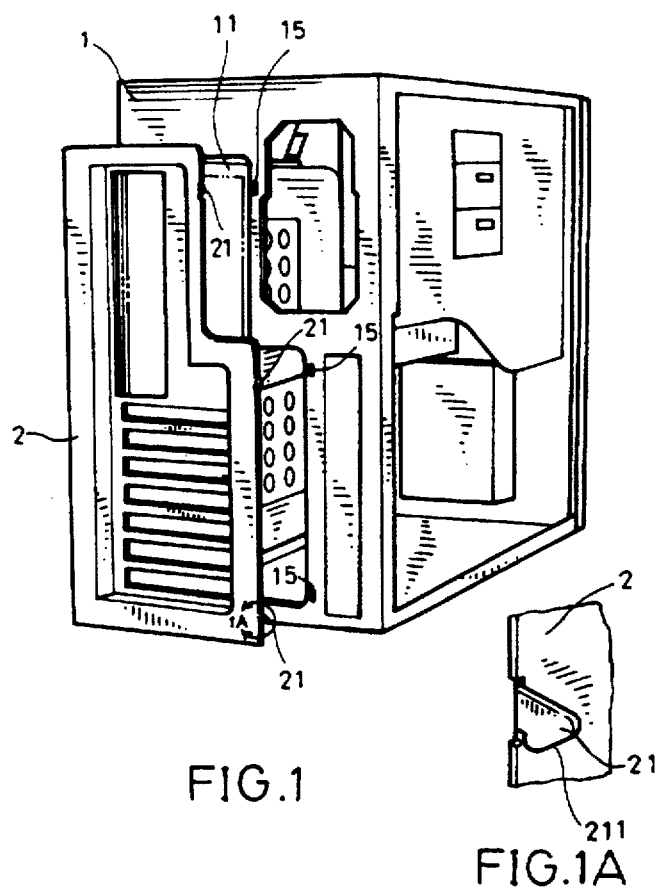
FIG. 1 shows the structure of the computer main circuit board rack drawn out of the computer housing.
Figure 4:
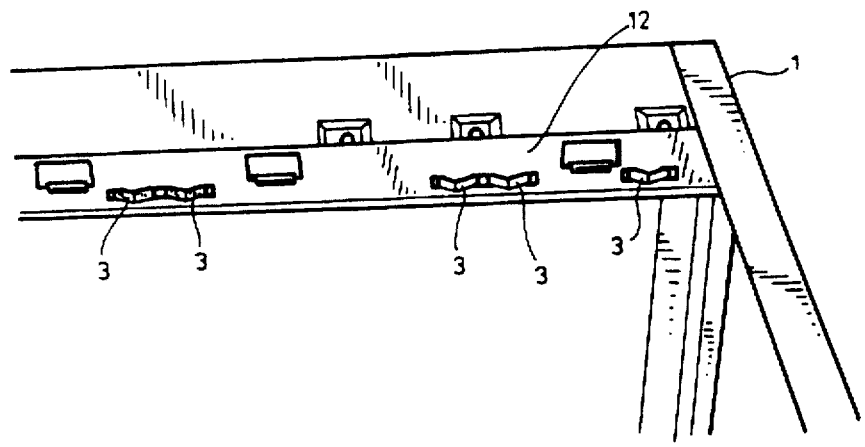
FIG. 4 shows the upper rail of the computer housing of the present invention.
Figure 5:
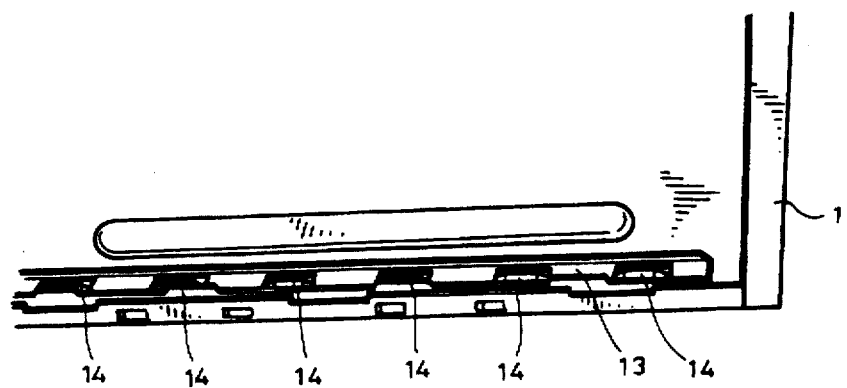
FIG. 5 shows the lower rail of the computer housing of the present invention.

Please refer to FIGS. 1 to 5. The present invention includes an L-shaped main circuit board rack sink 11 disposed on a computer housing 1 and an upper and a lower rails 12, 13 formed respectively at upper and lower ends of the rack sink 11 (referring to FIGS. 3 to 5). An L-shaped computer main circuit board rack 2 is inserted into the computer housing 1 through the upper and lower rails 12, 13 of the rack sink 11. An isolating block 14 is disposed in the lower rail 13 for reducing the resistance against sliding movement of the main circuit board rack 2 in the lower rail 13.

The computer housing 1 is formed with several engaging holes 15 at the end near the main circuit board rack sink 11, while several V-shaped leaf springs 3 are disposed in the upper rail 12. When the main circuit board rack 2 is inserted between the upper and lower rails 12, 13, the top end of the main circuit board 2 compresses and tightly contacts with the leaf springs 3 as shown in FIG. 3. The main circuit board rack 2 is disposed with engaging hooks 21 corresponding to the engaging holes 15 for engaging therewith. The bottom end of the engaging hook 21 is formed with an slope face 211 for guiding the engaging hooks 21 into the engaging holes 15. When the engaging hooks 21 are slided into the engaging holes 15, the leaf springs 3 in the upper rail 12 compress the engaging hooks 21 as shown in FIG. 2 so as to secure the main circuit board rack 2 on the computer housing 1. When it is desired to draw the main circuit board rack 2 out of the computer housing 1, the main circuit board rack 2 is lifted to compress the leaf springs 3 in the upper rail 12, whereby the engaging hooks 21 are disengaged from the engaging holes 15 of the computer housing 1, permitting the main circuit board rack 2 to be drawn out of the computer housing 1.

In addition, two semicircular clip plates 16 are disposed on the innermost side of the main circuit board rack sink 11, whereby when the main circuit board rack 2 is totally pushed and rested in the main circuit board rack sink 11, one end of the main circuit board rack 2 can extend into the clip plates 16 to be clipped thereby.

Moreover, the leaf springs 3 in the upper rail 12 of the computer housing 1 keep in contact with the main circuit board rack 2 so that the contacting area is increased and the conductivity between the main circuit board rack 2 and the computer housing 1 is improved. Also, the noise of the computer can be isolated more easily so as not to affect the ability of the computer.

The main circuit board rack of the present invention is secured to the computer housing in a drawing manner without using any screw or rivet. The main circuit board rack can be conveniently drawn out of the computer housing for replacing the interface card.

It is to be understood that the above description and drawings are only used for illustrating one embodiment of the present invention, not intended to limit the scope thereof. Any variation and derivation from the above description and drawings should be included in the scope of the present invention.

What is claimed is:

1. A computer main circuit board rack structure comprising a main circuit board rack sink disposed on a computer housing and an upper rail and a lower rail formed respectively at upper and lower ends of the rack sink, a computer main circuit board rack being inserted into the computer housing through the upper and lower rails of the rack sink, said main circuit board rack structure being characterized in that:

the computer housing is formed with several engaging holes at an end near the main circuit board rack sink and several leaf springs are disposed in the upper rail, the main circuit board rack being disposed with several engaging hooks for engaging with the engaging holes of the computer housing, a bottom end of each engaging hook being formed with an slope face for guiding the engaging hook into the engaging hole, a top end of the main circuit board rack compressing and tightly contacting with the leaf springs in the upper rail, whereby when it is desired to draw the main circuit board rack out of the main circuit board rack sink of the computer housing, the main circuit board rack is lifted to make the engaging hooks disengaged from the engaging holes of the computer housing.

2. A computer main circuit board rack structure as claimed in claim 1, wherein two clip plates are disposed on an innermost side of the main circuit board rack sink, whereby when the main circuit board rack is totally pushed and rested in the main circuit board rack sink, one end of the main circuit board rack is securely clipped by the clip plates.

* * * * *